Oct. 5, 1965 E. H. COOKE-YARBOROUGH ETAL 3,210,573
SEMICONDUCTOR DIODES USED IN A RATEMETER/INTEGRATOR CIRCUIT
Filed Dec. 9, 1964
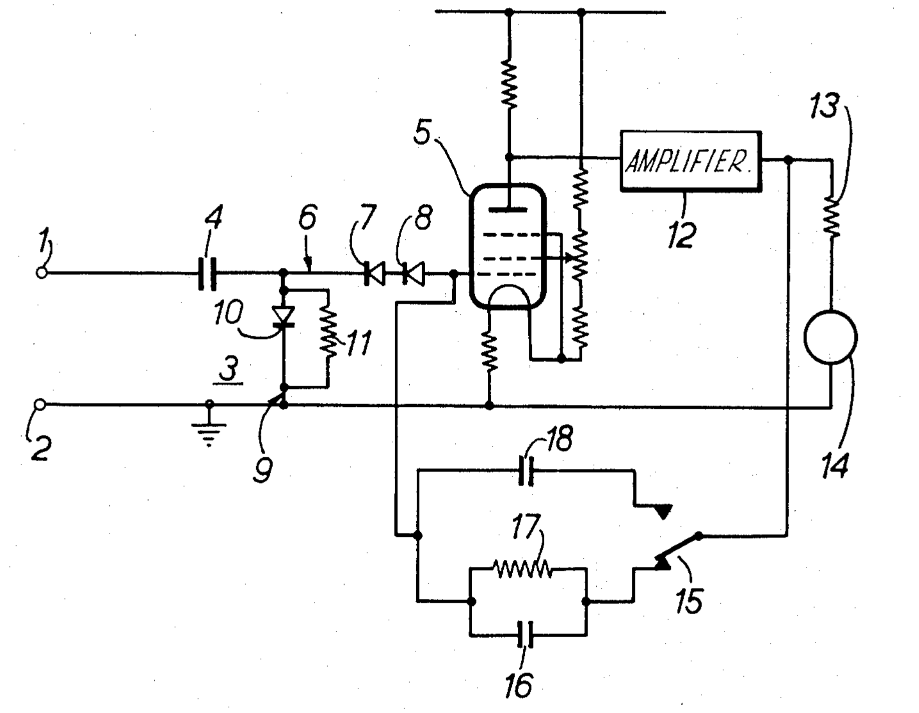

United States Patent Office 3,210,573
Patented Oct. 5, 1965

3,210,573
SEMICONDUCTOR DIODES USED IN A RATEMETER/INTEGRATOR CIRCUIT

Edmund Harry Cooke-Yarborough, Murray Hill, N.J., and John William Harold Wilkins, Didcot, and Denis John Marsh, Summertown, Oxford, England, assignors to United Kingdom Atomic Energy Authority, London, England Filed Dec. 9, 1964, Ser. No. 417,052
Claims priority, application Great Britain, Dec. 9, 1963, 48,479/63
5 Claims. (Cl. 307—88.5)

This invention relates to electric circuits using semiconductor diodes. More particularly, the invention relates to pump circuits for use in ratemeter/integrators, that is, in arrangements usable either as a ratemeter of as an integrator at the option of the user. "Ratemeter" as employed herein is intended to mean an arrangement for measuring the rate at which input pulses are supplied to it.

Until now, pump circuits for ratemeters have used high speed switching diodes, and pump circuits for integrators have used low leakage diodes. The distinctive property of high speed switching diodes is that their recovery time, that is the time which the diode takes to assume the high impedance condition after the removal of a forward bias and the application of a reverse bias, is very low, say not more than a few tens of nanoseconds. The distinctive property of low leakage diodes is that the leakage current which flows when the diode is reverse biased is very low, say not more than a few tenths of a microampere with a reverse bias of 100 volts.

Due to the different physical configurations dictated by the different properties desired, these two classes of diodes are mutually exclusive. As a result it has proved difficult to provide a satisfactory pump circuit for a ratemeter/integrator.

It is, therefore, an object of the present invention to provide an improved pump circuit for a ratemeter/integrator, in which the recovery time and the leakage current are very low.

According to the present invention, a pump circuit comprises a capacitance having an input terminal, to which an input signal is arranged to be supplied, and an output terminal, a first path connected between the output terminal of the capacitance and the output of the pump circuit, and a second path connected between the output terminal of the capacitance and earth, one of said paths having the properties of a semiconductor diode with very low recovery time and very low leakage current and comprising a high speed switching diode and a low leakage diode connected in series in the same sense, and the other path comprising a high speed switching diode in parallel with a resistor, the diodes in the two paths respectively being oppositely poled with respect to the capacitance.

A circuit in accordance with the present invention will now be described by way of example with reference to the accompanying drawing which shows a ratemeter/integrator of which the circuit forms a part.

Referring now to the drawing, the ratemeter/integrator has a pair of input terminals 1 and 2, terminal 2 being earthed, across which input voltage pulses are supplied during operation, and between which is connected a pump circuit 3. The pump circuit 3 includes a capacitor 4, one terminal of which is connected to the control grid of an electrometer valve 5 by way of a path 6 comprising semiconductor diodes 7 and 8. This terminal of the capacitor 4 is also connected to earth by way of a path 9 which comprises a diode 10 and a resistor 11 in parallel. The cathodes of the diodes 7 and 8 are nearer the capacitor 4, as is the anode of the diode 10. (Alternatively, all the diodes may be reversed.)

The diodes 7 and 10 are high speed switching diodes and the diode 8 is a low leakage diode.

The anode of the valve 5 is connected by way of a direct current transistor amplifier 12 and a resistor 13 to one terminal of a milliammeter 14, the other terminal of which is earthed. The output of the amplifier 12 is also connected to a switch 15 which offers the choice of two paths back to the control grid of the valve 5. In the position shown, which is used when ratemeter operation is required, the switch 15 connects the amplifier 12 by way of a capacitor 16 and a resistor 17 in parallel to the control grid of the valve 5, whilst in the other position, used when integrator operation is required, the amplifier 12 is connected by way of a capacitor 18 to the control grid of the valve 5.

The valve 5 has a very high input impedance and the gain of the amplifier 12 is so high that the potential of the control grid of the valve 5 remains substantially constant at a value very close to earth potential.

The operation is as follows. With the switch 15 in the position shown, that is for ratemeter operation, which is used when input pulses are arriving at a high rate, each input pulse results in an equal increment of charge being supplied to the capacitor 16. (It is assumed that the input pulses are all of equal amplitude and it is preferable for them to be supplied by a scale-of-two circuit.) The rate of arrival of input pulses is therefore indicated by the meter 14, the extent of the averaging effect being determined by the values of the capacitor 16 and the resistor 17.

With the switch 15 in the other position, that is for integrator operation, which is used when input pulses are arriving comparatively infrequently, the increments of charge are supplied to the capacitor 18 and the meter 14 indicates the number of pulses which have arrived.

When used as a ratemeter it is particularly desired that the linearity be good and the resolving time (the minimum time between the arrival of two pulses for them both to be indicated) be very short, whilst when used as an integrator it is particularly desired that the leakage from the capacitor 18 should be negligible over periods of many hours.

If two diodes only were used in the pump circuit 3, not all these requirements could be met, as ratemeter operation would demand high speed switching diodes and integrator operation would demand low leakage diodes. All the requirements are however met by having the diode arrangement described and the resistor 11. The reasons are believed to be as follows.

For accurate integrator operation there must be negligible loss of charge from the capacitor 18, and the low leakage diode 8 ensures that this is so.

In ratemeter operation the pump circuit 3 depends, for its linear operation, on a constant charge per input pulse being fed to the capacitor 16. This necessitates the capacitor 4 reaching equilibrium in the interval between the leading and trailing edges of each input pulse and this is why it is preferable to drive the ratemeter/integrator with a scale-of-two circuit.

Two other points arise in maintaining the linearity of ratemeter operation. Firstly, any recovered charge fed back from the diodes in the pump circuit 3, being out of phase with the applied charge, reduces the applied charge, and would result in a reduction of the indicated count rate. One of the characteristics of the low leakage diode 8 is that it has a large stored charge, but the removal of a forward bias voltage from across the diode 8 does not result in any appreciable part of this stored charge flowing back, as this is prevented by the fast return to the high impedance condition of the diode 7. The impedance seen by the diode 8 is therefore large and the stored charge recombines internally.

Secondly, it is necessary for the capacitor 4 to be discharged rapidly after each input pulse, as otherwise the charge fed to the capacitor 16 as a result of an input pulse will depend on the interval between that input pulse and the previous one. The capacitor 4 discharges to earth by way of the diode 10, and as the voltage across the capacitor 4 approaches zero the incremental resistance of the diode 10 becomes comparatively large with a consequent delay in the time of discharge. This difficulty is reduced by the provision of the resistor 11 which speeds up the discharge of the capacitor 4. In general, the time constant of the capacitor 4 taken with the resistor 11 should be less than the minimum interval between the trailing edge of one input pulse and the leading edge of the next.

As there is a virtual earth at the control grid of the valve 5, the pump circuit 3 may be operated with the paths 6 and 9 interchanged.

In one embodiment of the ratemeter/integrator the diodes 7 and 10 are type HD5004 supplied by Hughes International (UK) Ltd. and the diode 8 is type IS144 supplied by Texas Instruments Ltd. The capacitor 4 is 22 picofrads and the resistor 11 is 22 kilohms.

We claim:

1. A pump circuit comprising a capacitance having an input terminal, to which an input signal is arranged to be supplied, and an output terminal, a first path connected between the output terminal of the capacitance and the output of the pump circuit, and a second path connected between the output terminal of the capacitance and earth, one of said paths having the properties of a semiconductor diode with very low leakage current and comprising a high speed switching diode and a low leakage diode connected in series in the same sense, and the other path comprising a high speed switching diode in parallel with a resistor, each of the high speed switching diodes being such as to assume the high impedance condition in a very short time after the removal of a forward bias and the application of a reverse bias, and the low leakage diode being such that a very low leakage current flows when the diode is reverse biased, the diodes in the two paths respectively being oppositely poled with respect to the capacitance.

2. A pump circuit comprising a capacitance having an input terminal, to which an input signal is arranged to be supplied, and an output terminal, a path comprising a high speed switching diode and a low leakage diode connected in series in the same sense between the output terminal of the capacitance and the output of the pump circuit, and a further path comprising a high speed switching diode in parallel with a resistor connected between the output terminal of the capacitance and earth, each of the high speed switching diodes being such as to assume the high impedance condition in less than a hundred nanoseconds after the removal of a forward bias and the application of a reverse bias, and the low leakage diode being such that a leakage current of less than a microampere flows when there is a reverse bias of a hundred volts across the diode, the diodes in the two paths respectively being oppositely poled with respect to the capacitance.

3. A pump circuit comprising a capacitance having an input terminal, to which an input signal is arranged to be supplied, and an output terminal, a path comprising a high speed switching diode and a low leakage diode connected in series in the same sense between the output terminal of the capacitance and earth, and a further path comprising a high speed switching diode in parallel with a resistor connected between the output terminal of the capacitance and the output of the pump circuit, each of the high speed switching diodes being such as to assume the high impedance condition in less than a hundred nanoseconds after the removal of a forward bias and the application of a reverse bias, and the low leakage diode being such that a leakage current of less than a microampere flows when there is a reverse bias of a hundred volts across the diode, the diodes in the two paths respectively being oppositely poled with respect to the capacitance.

4. A ratemeter/integrator including a pump circuit comprising a first capacitance having an input terminal, to which an input signal to the ratemeter/integrator is arranged to be supplied, and an output terminal, a path comprising a high speed switching diode and a low leakage diode connected in series in the same sense between the output terminal of the first capacitance and the output of the pump circuit, and a further path comprising a high speed switching diode in parallel with a first resistor connected between the output terminal of the first capacitance and earth, each of the high speed switching diodes being such as to assume the high impedance condition in a very short time after the removal of a forward bias and the application of a reverse bias, and the low leakage diode being such that a very low leakage current flows when the diode is reverse biased, the diodes in the two paths respectively being oppositely poled with respect to the first capacitance, a first amplifier with very high input impedance having an input which is connected to the output of said pump circuit and an output, a second amplifier with high gain having an input which is connected to the output of the first amplifier and an output, a second capacitor, a third capacitor in parallel with a second resistor, a switch when integrator operation is required connects the output of the second amplifier by way of the second capacitor to the input of the first amplifier and when ratemeter operation is required connects the output of the second amplifier by way of the parallel combination of the third capacitor and the second resistor to the input or the first amplifier, and a current measuring device connected between the output of the second amplifier and earth.

5. A ratemeter/integrator including a pump circuit comprising a first capacitance having an input terminal, to which an input signal to the ratemeter/integrator is arranged to be supplied, and an output terminal, a path comprising a high speed switching diode and a low leakage diode connected in series in the same sense between the output terminal of the first capacitance and earth, and a further path comprising a high speed switching diode in parallel with a first resistor connected between the output terminal of the capacitance and the output of the pump circuit, each of the high speed switching diodes being such as to assume the high impedance condition in a very short time after the removal of a forward bias and the application of a reverse bias, and the low leakage diode being such that a very low leakage current flows when the diode is reverse biased, the diodes in the two paths respectively being oppositely poled with respect to the first capacitance, a first amplifier with very high input impedance having an input which is connected to the output of said pump circuit and an output, a second amplifier with high gain having an input which is connected to the output of the first amplifier and an output, a second capacitor, a third capacitor in parallel with a second resistor, a switch which when integrator operation is required connects the output of the second amplifier by way of the second capacitor to the input of the first amplifier and when ratemeter operation is required connects the output of the second amplifier by way of the parallel combination of the third capacitor and the second resistor to the input of the first amplifier, and a current measuring device connected between the output of the second amplifier and earth.

No references cited.

ARTHUR GAUSS, *Primary Examiner.*